United States Patent [19]
Dunbar

[11] Patent Number: 5,977,727
[45] Date of Patent: Nov. 2, 1999

[54] ELECTRON BEAM PROFILE AND ENERGY SHAPING LENS

[75] Inventor: Thomas A. Dunbar, Horseheads, N.Y.

[73] Assignee: Imaging & Sensing Technology Corporation, Horseheads, N.Y.

[21] Appl. No.: 08/853,538

[22] Filed: May 9, 1997

[51] Int. Cl.$^6$ .............. H01J 29/56; G09G 5/00; H04N 9/16
[52] U.S. Cl. .............. 315/382; 315/15; 315/16; 315/368.15; 348/781; 348/805; 345/9
[58] Field of Search .................. 313/414, 460; 348/284, 290, 291, 776, 781, 782, 805; 345/7, 9; 315/15, 16, 368.15, 382, 382.1

[56] References Cited

U.S. PATENT DOCUMENTS

| | | | |
|---|---|---|---|
| 3,885,095 | 5/1975 | Wolfson et al. | 348/115 |
| 4,786,845 | 11/1988 | Kato et al. | 315/382 |
| 4,899,091 | 2/1990 | Odenthal | 315/382 |
| 4,967,120 | 10/1990 | Katsuma et al. | 315/382 |
| 5,034,653 | 7/1991 | Cho et al. | 313/414 |
| 5,663,609 | 9/1997 | Kamohara et al. | 313/412 |
| 5,689,158 | 11/1997 | Chen | 315/382.1 |

*Primary Examiner*—Edward P. Westin
*Assistant Examiner*—Shane R. Gardner
*Attorney, Agent, or Firm*—Phillips, Lytle, Hitchcock, Blaine & Huber, LLP

[57] ABSTRACT

An apparatus and method to dynamically shape the projected energy profile of an electron beam and the energy distribution of an electron beam of a cathode ray tube to provide a single cathode ray tube the ability to display multiple image formats of varying resolutions, brightnesses and aspect ratios. In one embodiment, the invention contemplates the introduction of a shaping lens along the path of the electron beam comprising at least three electrodes. Voltages are selectively applied to the electrodes to dynamically and selectively vary the projected energy profile of an electron beam in a plane perpendicular to the longitudinal axis of the cathode ray tube.

39 Claims, 6 Drawing Sheets

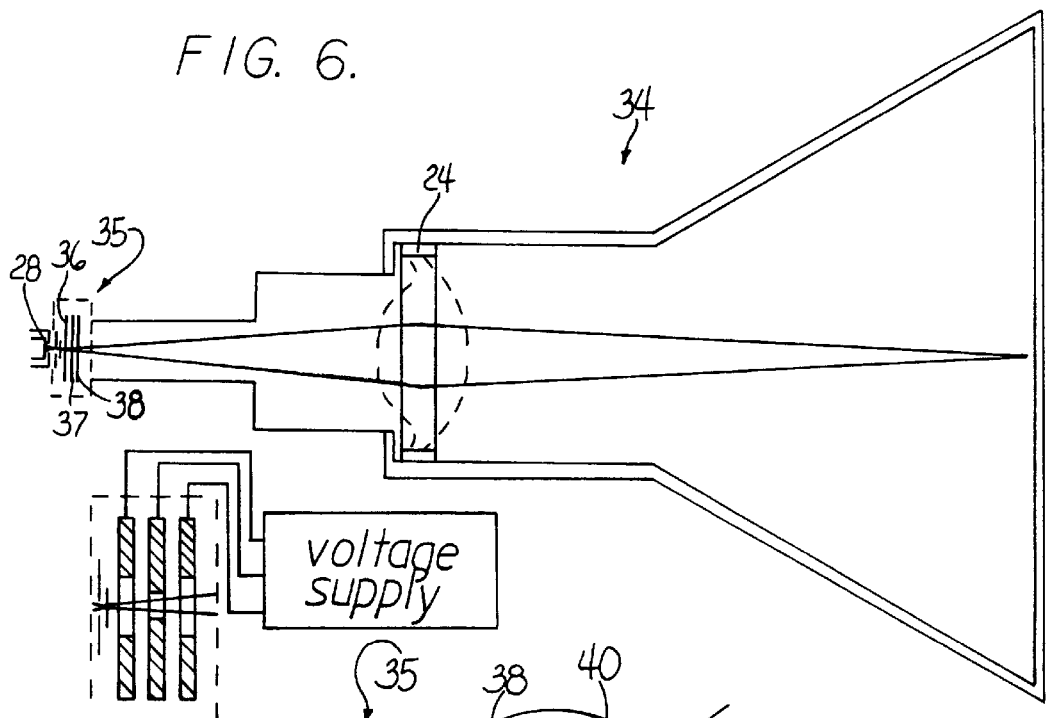
FIG. 6.
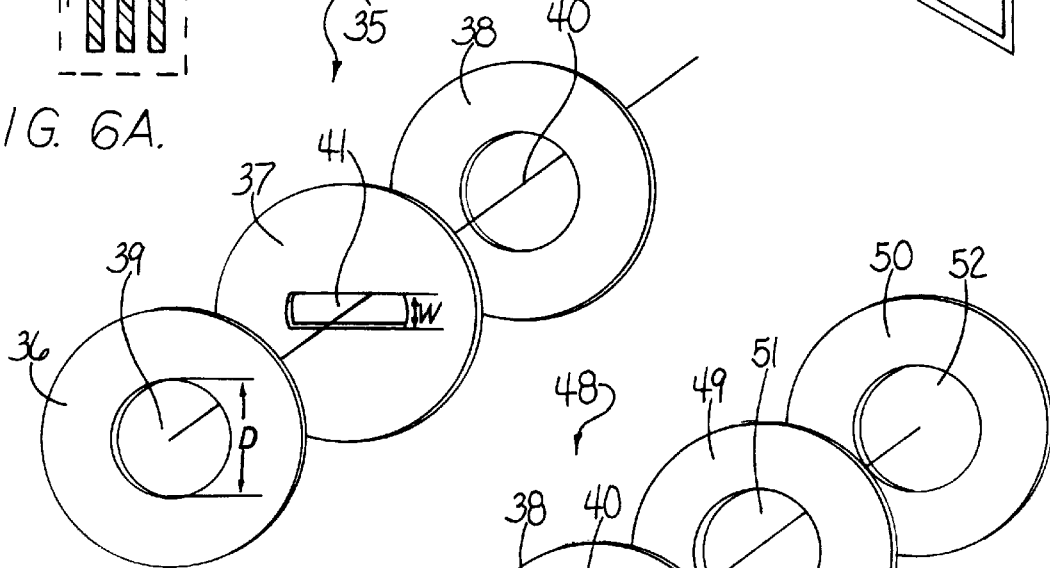
FIG. 6A.
FIG. 7.
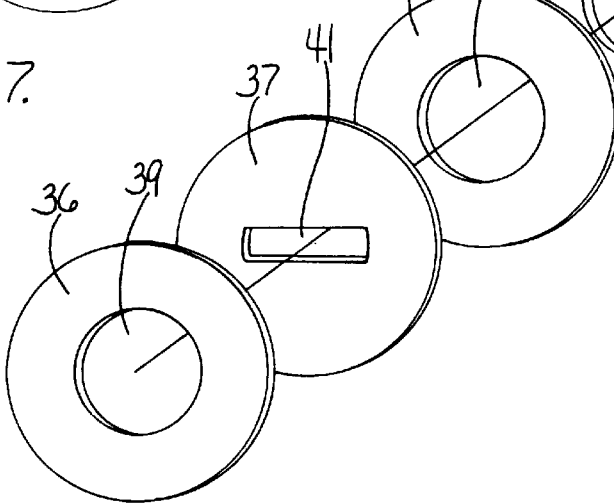
FIG. 9.

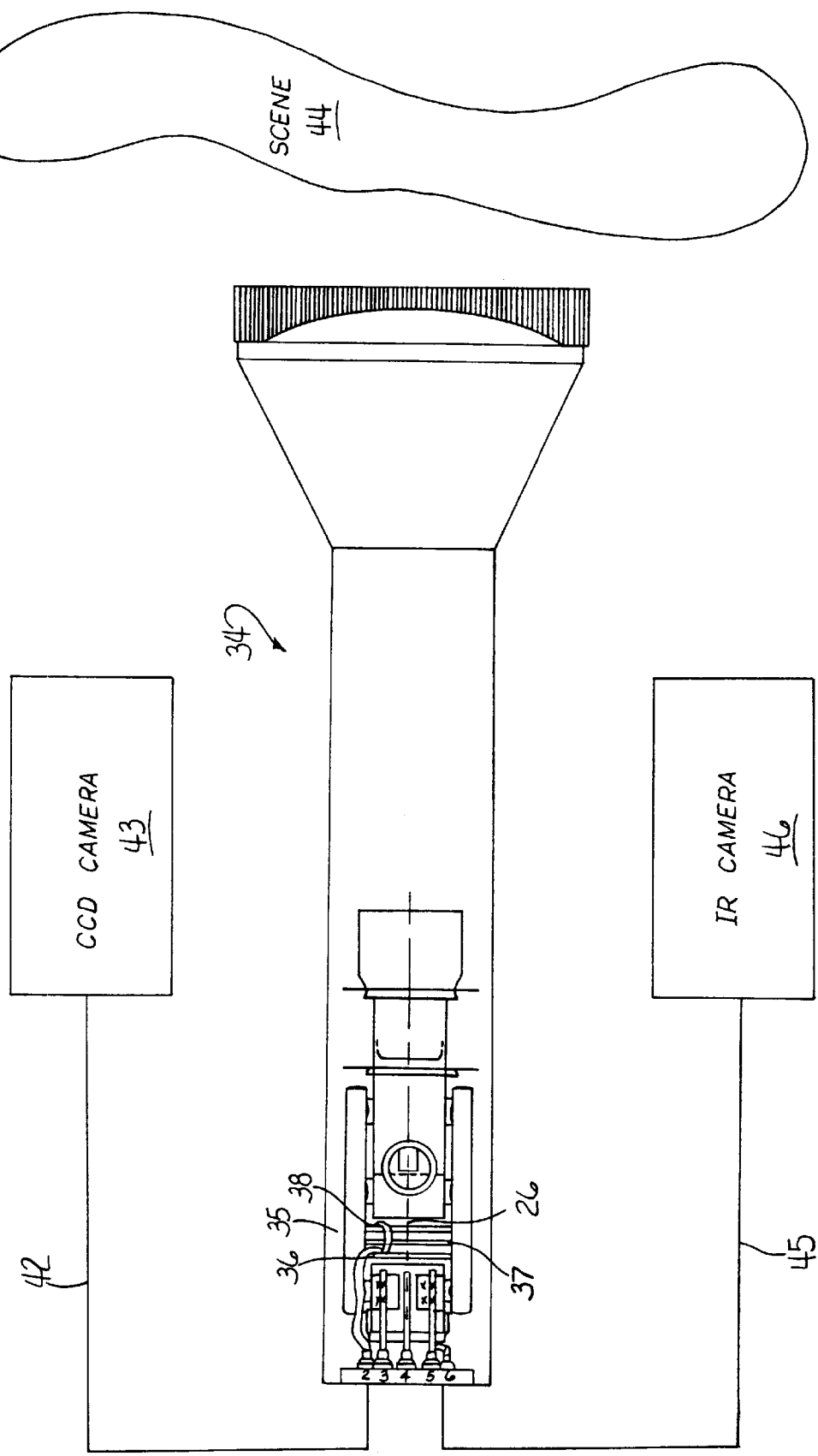

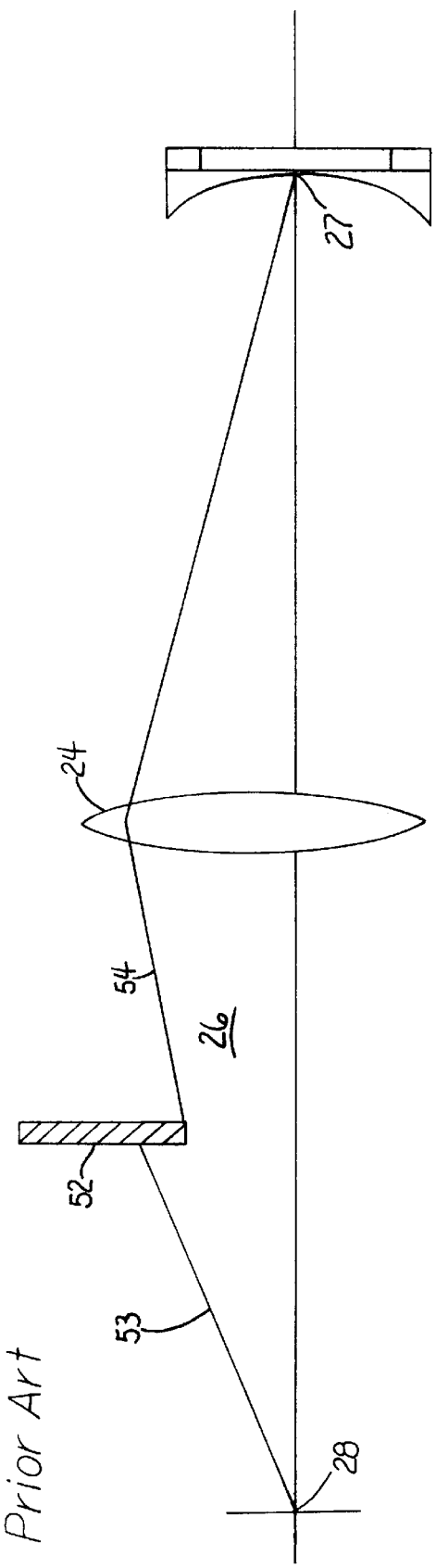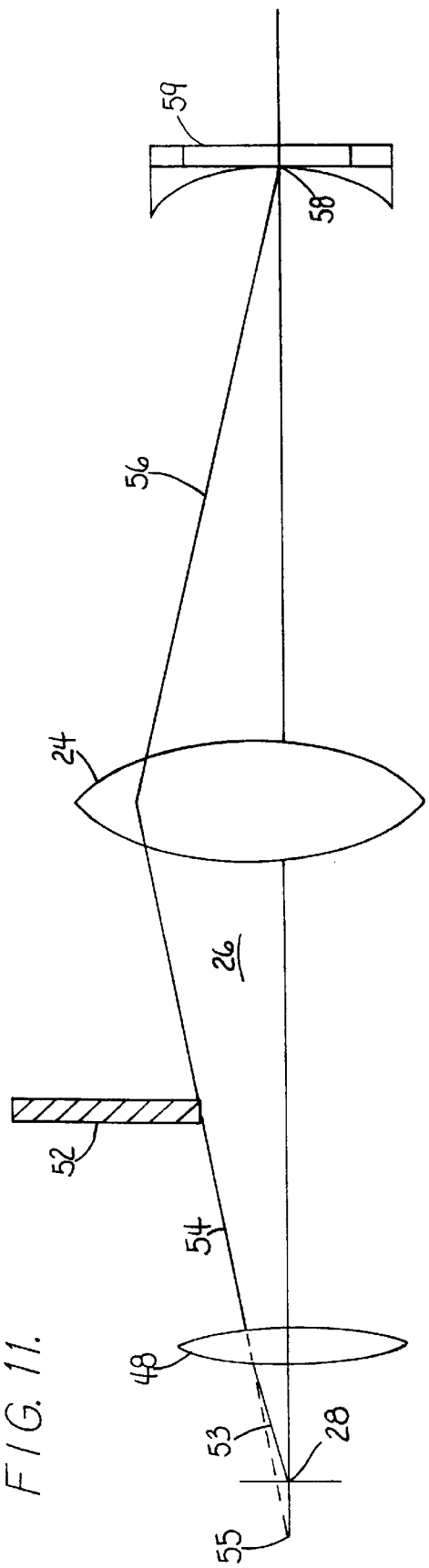
FIG. 10. Prior Art
FIG. 11.

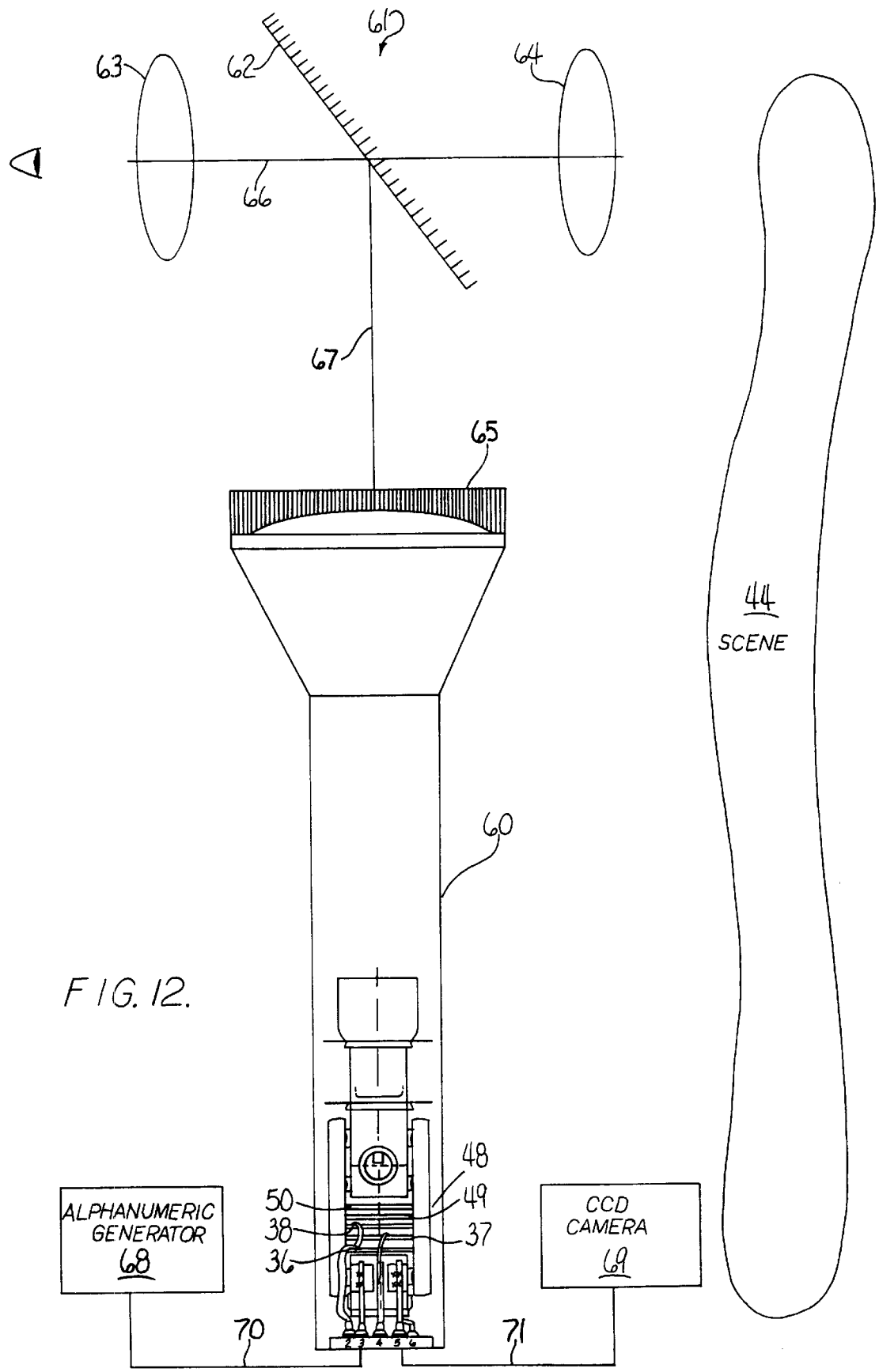

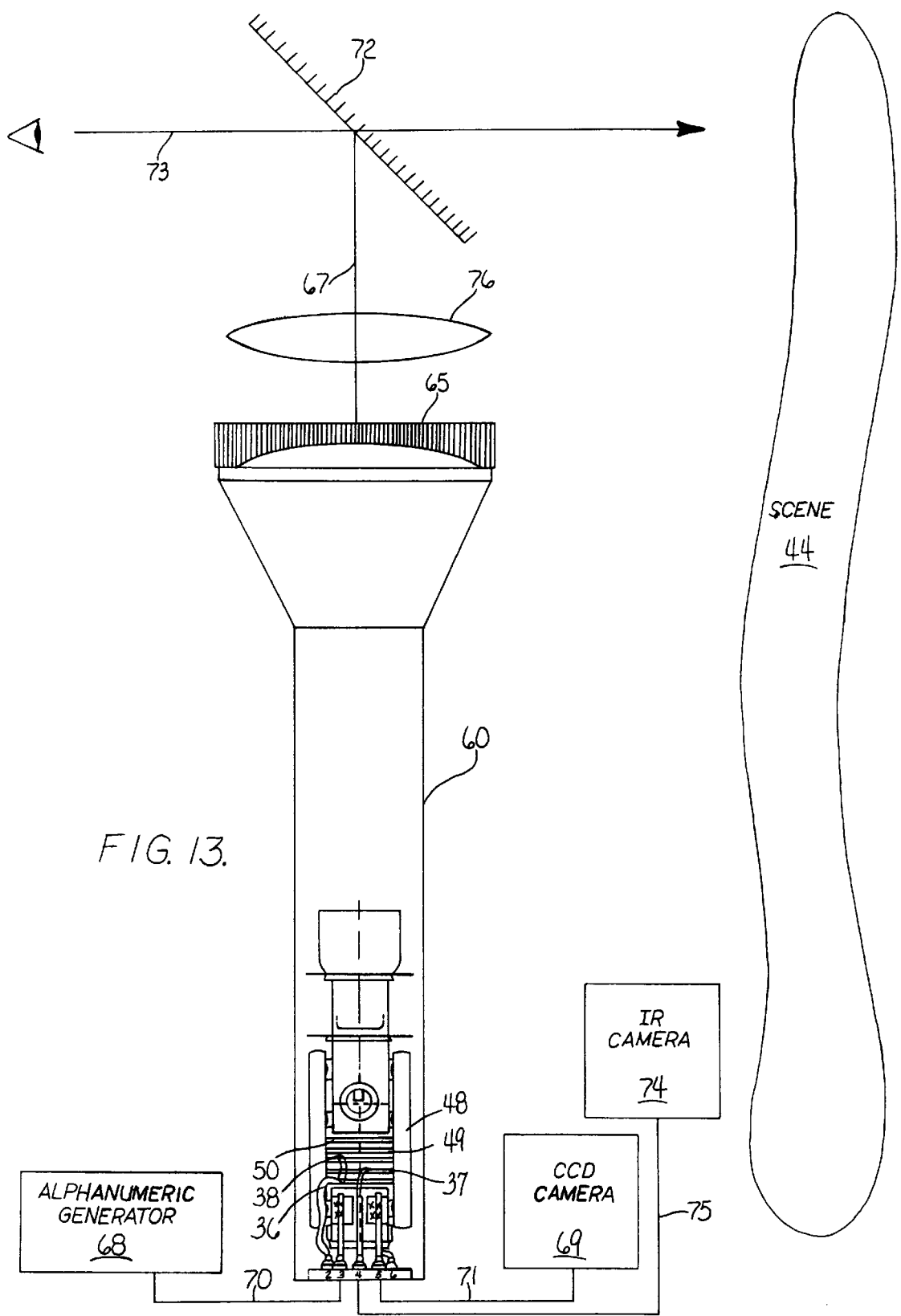

5,977,727

ELECTRON BEAM PROFILE AND ENERGY SHAPING LENS

TECHNICAL FIELD

The invention relates generally to cathode ray tubes (CRTs), and, more specifically, to apparatus and a method for dynamically shaping the projected energy profile and distribution of an electron beam of a CRT to provide a single CRT with the ability to display multiple image formats of varying resolutions, brightnesses and aspect ratios.

BACKGROUND ART

Electron optics of traditional CRTs are constructed of mechanical electrodes having apertures to which voltages are applied. It is also known to supply currents to coils to create magnetic fiels for shaping the electron beam of a CRT. These systems alter the electron beam trajectory with electrostatic or magnetic fields.

In prior art CRTs, the electron beam is generated from a thermoinic dispenser or field-emitting cathode. The beam is accelerated and focused to a first crossover (object point) by first and second accelerator electrodes. The apertures in these electrodes are known to have either a circular cross-section or a two-axis (rectangular) cross-section and provide a desired shape, or projected energy profile, of the electron beam in the plane perpendicular to its longitudinal axis. The projected energy profile at an object point correspondingly will have a circular or elliptical profile in a plane perpendicular to the longitudinal axis of the electron beam. In both cases, the electron beam has a closely Gaussian energy distribution along each axis perpendicular to the longitudinal axis of the electron beam.

The beam is then focused to an image point on the phosphor screen using traditional main focusing lenses, which are either electrostatic or magnetic. The apertures of these lenses have a circular cross-section and provide a magnified or minified image point energy profile of the object point energy profile. Elliptical object point projected energy profiles are used to match the color stripes of color CRTs. Circular object point projected energy profiles are used for high-resolution monochrome CRTs.

It is also known to dynamically correct for astigmatism of projected energy profiles in a plane that is not perpendicular to the longitudinal axis of the electron beam by altering the projected energy profile of an electron beam in a plane perpendicular to its longitudinal axis by using a focusing lens placed along the path of the electron beam. Astigmatism occurs when the angle of the deflection of an electron beam is high enough to strike the outer edges of a large phosphor screen. Although an electron beam generally maintains the shape of its projected energy profile in a plane perpendicular to its longitudinal axis, the edges of a large phosphor screen are far from being perpendicular to the longitudinal axis of the electron beam. Thus, the energy profile projected onto the edge of a phosphor screen is different than the energy profile projected in a plane perpendicular to its longitudinal axis. As the deflection angle of the electron beam increases, so does the amount of distortion, or astigmatism, to the projected energy profile of the electron beam. Others have suggested correcting for astigmatism by using different focusing lenses comprising a series of electrodes to alter the profile of the electron beam in the plane perpendicular to its longitudinal axis before deflection. (See U.S. Pat. Nos. 5,164,640 to Son et al.; 5,055,749 to Chen et al.; 5,036,258 to Chen et al.; 4,978,886 to Miyamoto et al; and 4,814,670 to Suzuki et al.) Thus, the desired image point projected energy profile is projected on the edges of the phosphor screen.

It is also known to use a single CRT to display images from different imaging sources, such as charge-coupled device cameras (CCD cameras) and infrared cameras (IR cameras). Unfortunately, CCD and IR cameras normally have different resolutions and/or aspect ratios. CCD cameras traditionally have high horizontal and vertical resolution (e.g., 640 pixels×480 pixels) whereas IR cameras traditionally have high horizontal resolution but low vertical resolution (e.g., 640 pixels×120 pixels). An IR image may only use one-quarter of the vertical resolution of a CRT designed for a CCD camera, thus leaving dark horizontal bands on the CRT. This "venetian blind" effect is distracting and reduces the usefulness of the displayed IR image. Accordingly, it would be useful to provide a CRT capable of displaying images from sources having dissimilar resolutions and/or aspect ratios.

Heads-up-display (HUD) systems are well known. They comprise a CRT which projects an image onto a transparent carrier through which a pilot/driver views a scene. The projected image may include data such as navigational information, weapon status information, targeting information and terrain enhancement. The pilot/driver sees the projected image as part of the scene viewed. However, the different types of data typically provided by HUD systems are best delivered at different resolutions and brightness. For example, alphanumeric information is presented in high brightness and medium resolution, (e.g., 320 pixels×240 pixels) and is drawn using a stroke (vector) mode display. This allows the alphanumeric information to be easily viewed even when the pilot/driver is surrounded by bright light. Terrain enhancement is accomplished by displaying an IR camera image at lower brightness, high-horizontal resolution and low-vertical resolution (e.g., 640 pixels×120 pixels), and by using a raster scan (line scan) mode display. Finally, CCD images are best presented in low brightness and high resolution (e.g., 640 pixels×480 pixels), and by using a raster scan (line scan) mode display. The prior art teaches using a different CRT to provide each type of image to a HUD system.

In addition, it is known to display more than one type of information on a HUD system simultaneously using sources having different display characteristics. For example, it may be necessary for the pilot/driver to use both IR terrain enhancement and alphanumeric navigation and targeting information concurrently. The multiple CRT solution of the prior art is capable of providing multiple displays simultaneously to a HUD system where each CRT provides a display of varying resolution, brightness and mode. Unfortunately, multiple CRT systems are expensive and susceptible to mechanical and electrical failure. It would be advantageous to provide a single CRT that could switch between multiple display modes having different characteristics to display images in rapid succession such that the human eye would perceive the projected images as being presented simultaneously.

DISCLOSURE OF THE INVENTION

With parenthetical reference to corresponding parts and portions for purposes of illustration and not by means of limitation, an improved cathode ray tube (e.g. 34) is disclosed. The CRT includes an elongated envelope (e.g. 21), a phosphor screen (e.g. 22), and an electron source (e.g. 25) adapted to project an electron beam (e.g. 26) along the elongated envelope between the electron source and the phosphor screen. The improvement is a shaping lens (e.g. 35) having at least three electrodes (e.g. 36, 37 and 38) arranged in series along the path of the electron beam. Each electrode has an aperture (e.g. 39, 40 and 41). The apertures of the first and third electrodes are circular, and the aperture of the second electrode in the form of a slit having generally-parallel sides. The improvement further includes means for selectively applying respective voltages to the electrodes. The improved CRT is able to dynamically and selectively vary the projected energy profile of an electron beam in a plane perpendicular to the longitudinal axis of the CRT.

The invention also teaches a method to apply multiple voltage patterns to the improved CRT structure to vary the energy profile of a projected electron beam. This method includes applying a first voltage pattern where the voltage applied to each electrode is equal, and a second voltage pattern where equal voltage is applied to each electrode, but the second to which is applied a significantly-lesser voltage. The first voltage pattern corresponds to a first display mode particularly suited to be a display for a high-resolution camera (e.g. 43), and the second voltage pattern corresponds to a second display mode particularly suited as a display for status information.

A second method of operating the invention involves selectively applying either a first voltage pattern to the shaping lens to produce the projected energy profile at an image point that is round, or applying a second voltage pattern to the shaping lens to produce a projected energy profile image point that is generally elliptical. In particular, the method teaches a first voltage pattern of equal voltages to all electrodes, and a second voltage pattern of equal voltages to each electrode but the second, to which is applied a slightly-lesser voltage. The first voltage pattern corresponds to a first display mode which is particularly suited to be a display for a high-resolution camera, with the second voltage pattern corresponding to a second display mode particularly suited to be a display for an infrared camera (e.g. 74).

The invention teaches displaying each display mode independently and separately, or alternating rapidly between display modes such that the human eye perceives the two modes simultaneously.

Finally, the invention teaches an improved CRT (e.g. 48) identical to that previously disclosed except for the addition to the shaping lens of fourth and fifth electrodes (e.g. 49 and 50) having generally-circular apertures (e.g. 51 and 52). The five-electrode shaping lens supports three display modes corresponding to three applied voltage patterns. The voltage pattern for the first display mode provides equal voltages to all five electrodes. The voltage pattern for the second display mode provides equal voltages to the first, third, fourth and fifth electrodes, and a slightly-lesser voltage to the second electrode. Finally, the third voltage pattern provides equal voltages to the first, second, third and fifth electrodes, and significantly-lesser voltage to the fourth electrode. The first voltage pattern corresponds to a first display mode and is particularly suited for a high-resolution camera display. The second voltage pattern corresponds to a second display mode and is particularly suited for an infrared camera display. The third voltage pattern corresponds to a third display mode and is particularly suited to provide a status information display. Again, these three modes can be generated separately and exclusively from one another, or a rapid alternation between any two can cause a human eye to perceive those two modes simultaneously.

Accordingly, an object of the invention is to provide a CRT which can display images from image sources having different resolutions.

Another object of the invention is to provide a CRT which can display images from image sources at different brightnesses.

Another object of the invention is to provide a CRT which can be toggled between multiple display modes having different characteristics.

Another object of the invention is to provide a CRT which displays multiple images, each having different display characteristics, rapidly such that the human eye perceives the multiple displays simultaneously.

Another object of the invention is to provide a CRT which can selectively display images from both a CCD camera and an IR camera.

Another object of the invention is to provide a CRT which can selectively display images from both a CCD camera and an alphanumeric generator.

Another object of the invention is to provide a CRT which can selectively display images from a CCD camera, an IR camera or an alphanumeric generator.

Another object of the invention is to provide a CRT that can display images from a CCD camera and an alphanumeric generator in such rapid succession that the human eye perceives their display as being simultaneous.

A further object of the invention is to provide a CRT that can display images from an IR camera and an alphanumeric generator in such rapid succession that the human eye perceives the images as being simultaneous.

BRIEF DESCRIPTION OF THE DRAWINGS

FIG. 6 is a CRT of the current invention.

FIG. 6A shows a portion of FIG. 6 enlarged.

FIG. 7 displays the electrodes of a three electrode shaping lens in exploded relation.

FIG. 8 is a first embodiment of the invention.

FIG. 9 displays the electrodes of a five-electrode shaping lens in exploded relation.

FIG. 10 is a representation of an electron beam traveling through a CRT of the prior art.

FIG. 11 is a representation of an electron beam traveling through a CRT of the invention.

FIG. 12 is a second embodiment of the invention as used in an optical sighting system.

FIG. 13 is a third embodiment of the invention as used in a heads-up display system.

DESCRIPTION OF THE PREFERRED EMBODIMENT

Figure 1:
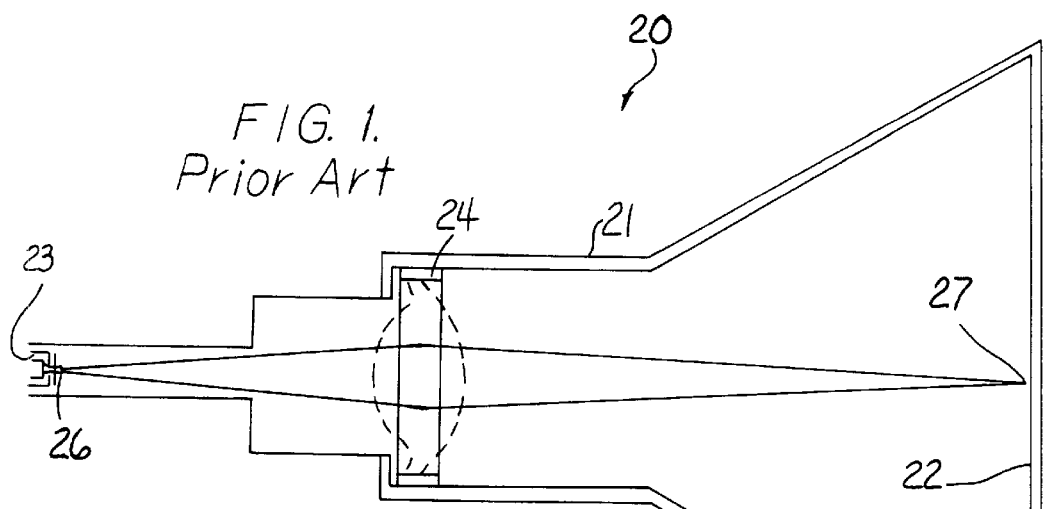
FIG. 1 is a schematic of a prior art CRT.

At the outset, it should be clearly understood that like reference numerals are intended to identify the same structural elements, portions, or surfaces, consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up", and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis or elongation, or axis of rotation, as appropriate.

Figure 2:
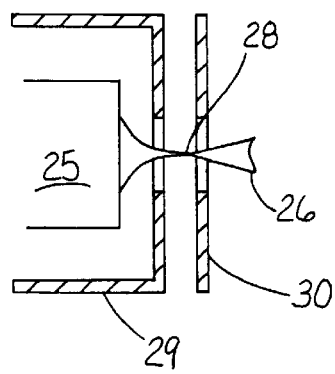
FIG. 2 is the electron beam gun and first and second accelerators of a prior art CRT.

Adverting now to FIG. 1, a standard CRT 20 of the prior art is depicted to generally comprise an elongated envelope 21, terminating at its rightward end at a phosphor screen 22 and at its leftward end at an electron gun assembly 23, and having an electrostatic focusing lens 24 between phosphor screen 22 and electron gun assembly 23. FIG. 2 is an enlargement of an electron gun assembly 23 showing cathode 25 emitting an electron beam 26 focused to an object point 28 by first and second annular accelerator electrodes 29 and 30, respectively. Voltages are impressed upon electrodes 29 and 30 to produce electrostatic fields to modify the boundary and shape of electron beam 26, and thus its projected energy profile.

Referring again to FIG. 1, electron beam 26 is directed rightwardly and expands until reaching the area of electrostatic focus lens 24. Electrostatic focus lens 24 serves two purposes: (1) focusing electron beam 26 such that it is the desired size when it strikes on phosphor screen 22 at image point 27, and (2) deflecting electron beam 26 to a desired location on phosphor screen 22.

It is advantageous to use the same CRT to view the images from multiple imaging devices, such as optical scopes, high-resolution cameras and infrared cameras. This is especially true in the aviation industry and for military applications. However, each type of imaging device is likely to provide images of varying resolutions, brightnesses and aspect ratios. Accordingly, a CRT having a clear display for one type of imaging device may provide a virtually unusable display of a second imaging device.

Figure 3:
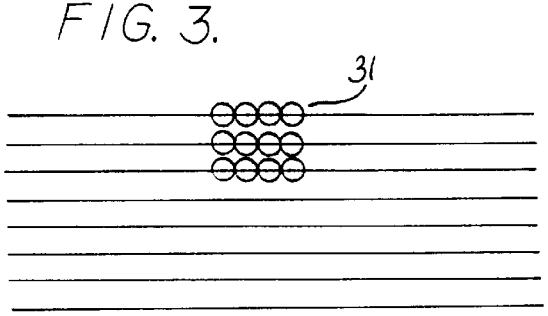
FIG. 3 is the display of a portion of a high-resolution CCD camera image.
Figure 4:
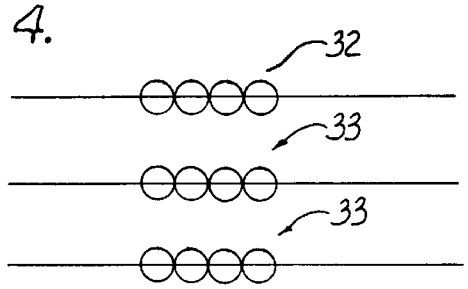
FIG. 4 is the display of a portion of an IR camera image of high horizontal resolution and low vertical resolution on a CRT design to display images of high vertical and horizontal resolution.
Figure 5:
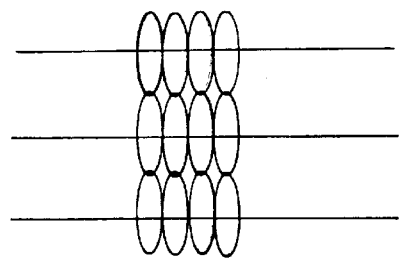
FIG. 5 is the display provided by the invention of a portion of an IR camera image of high horizontal resolution but low vertical resolution on a phosphor screen designed for both high vertical and horizontal resolution.

For example, viewing an IR camera image on a CRT designed for CCD camera input may lead to a "venetian blind" effect. FIG. 3 shows a 4 pixel by 3 pixel array 31 of a CCD camera image displayed on a high-resolution CRT. FIG. 4 shows a 4 pixel by 3 pixel array 32 of an IR camera image displayed on the same CRT as is FIG. 3. The horizontal lines of pixels in FIG. 4 are spaced three times further from one another than the horizontal lines of pixels in FIG. 3. This ensures the IR camera image is displayed over the entire CRT screen. Accordingly, the CRT display of the IR camera image is not contiguous, leading to dark bands 33 between the horizontal lines or a "venetian blind" effect. As shown in FIG. 5, the present invention contemplates stretching the electron beam to make the image point profile of the electron beam projected on phosphor screen 22 generally elliptical to fill dark bands 33. This is accomplished by a shaping lens.

FIGS. 6 and 6A show an improved CRT 34 including a three-electrode shaping lens 35 positioned between object point 28 and electrostatic focus lens 24. The shaping lens 35 comprises three sequential electrodes 36, 37 and 38. Best performance of the shaping lens is achieved when it is positioned less than 0.1 inch from object point 28. As better shown in FIG. 7, each of the three electrodes 36, 37 and 38 is annular and has a central aperture. The shape of apertures 39 and 40 in electrodes 36 and 38, respectively, is circular, while aperture 41 in electrode 37 is in the form of a slit having generally-parallel sides. The optimal dimensions of aperture 41 are a function of the dimensions of apertures 39 and 40. Best results occur if the width W of aperture 41 is between 0.10 and 0.33 of the diameter of apertures 39 and 40. In addition, better performance occurs when the axial distance between electrodes 36 and 37 and between electrodes 37 and 38 is approximately the radius R of apertures 39 and 40. Of course, these are only suggested dimensions and other combinations of spacing and aperture dimensions are possible.

A current source applies a desired voltage pattern upon three-electrode shaping lens 35 to cause an appropriate alteration to the profile of electron beam 26.

It would be useful if a single CRT could display images from a CCD camera and IR camera of differing resolutions without any discontinuities on the display. The instant invention can provide such a solution through a shaping lens to provide multiple display modes for a CRT.

EXAMPLE 1

Referring to FIG. 8, CRT 34 switches between Mode I and Mode II depending on the received image. The characteristics of Mode I and Mode II are presented below in Table 1.

TABLE 1

|  | Resolution | Voltage Pattern | Projected Energy Profile | Imaging Device |
| --- | --- | --- | --- | --- |
| Mode I | 640 pixels × 480 pixels | $V_{36} = V_{37} = V_{38} =$ 500v | ○ | CCD camera |
| Mode II | 640 pixels × 120 pixels | $V_{36} = V_{38} = 500v; V_{37} = 460v$ | 0 | IR camera |

Receipt of CCD camera image 42 of a scene 44 will cause CRT 34 to enter Mode I where the same voltage is applied to all three electrodes (i.e., $V_{36}=V_{37}=V_{38}$) Shaping lens 35 has no effect on electron beam 26 in Mode I. Electron beam 26 enters shaping lens at electrode 36 and exits at electrode 38 having generally-circular energy.

CRT 34 enters Mode II when it receives IR camera image 45 of scene 44. In Mode II, the voltage applied to electrodes 36 and 38 is equal (i.e., $V_{36}=V_{38}$), but the voltage applied to electrode 37 is less than that applied to middle electrodes 36 and 38 (i.e., $V_{37}<V_{36}$ or $V_{38}$). In Mode II, electron beam 26 enters shaping lens 35 at electrode 36 having a generally-circular energy profile perpendicular to its longitudinal axis, and exits at electrode 38 having a generally-elliptical energy profile perpendicular to its longitudinal axis. The voltage applied to electrode 37 must be less than that applied to electrodes 36 and 38. However, for optimal performance, the voltages applied to electrode 37 should not be less than 0.75 of the voltage applied to electrodes 36 and 38.

The projected energy profile of electron beam 26 in a plane perpendicular to its longitudinal axis upon exiting electrode 38 is generally elliptical and has a minor axis generally equal to the diameter of the profile of electron beam 26 before entering electrode 36. Thus, although the profile of electron beam 26 is stretched vertically (i.e., along its major axis) to compensate for the coarser vertical resolution of IR camera 46, the resulting profile remains unchanged horizontally to avoid overlap as IR camera 46 and CCD camera 43 have the same horizontal resolution.

A second embodiment of the invention contemplates a shaping lens having five sequential electrodes through which an electron beam passes. FIG. 9 shows a five-electrode shaping lens 48. Electrodes 49 and 50 are added to previously-disclosed three-electrode shaping lens 35. Electrodes 49 and 50 are symmetry-similar to electrodes 36 and 38. Each is generally circular and has a circular apertures, 51 and 52, respectively. Five-electrode shaping lens 48 can provide the displays of Modes I and II described earlier, and can also be manipulated to modify the amount of energy of the projected energy profile of electron beam 26. The projected energy profile of electron beam 26 perpendicular to its longitudinal axis is generally Gaussian. The center of the projected energy profile has the greatest absolute energy, with the absolute energy of any point distant from the center defined as an inverse function of the distance from the center, but always less than the energy at the center.

FIG. 10 schematically depicts the path of electron beam 26 as it travels from object point 28, past aperture 52, through focusing lens 24, and finally to image point 27. The boundary of electron beam 26 prior to reaching aperture 52 is indicated by reference number 53. Aperture 52 prevents a portion of electron beam 26 from further travel, reducing the boundary of electron beam 26, and thus, its overall energy.

FIG. 11 is the same as FIG. 10 except that five-electrode shaping lens 48 is placed between object point 28 and focus lens 24. The voltage pattern applied to five-electrode shaping lens 48 is $V_{36}=V_{37}=V_{38}=V_{50}=500$ volts and $V_{49}=60$ volts. Electron beam 26 in FIG. 11 has the same boundary 53 as electron beam 26 in FIG. 10 between object point 25 and shaping lens 48. However, as electron beam 26 passes through five-electrode shaping lens 48, it is narrowed to the boundary indicated by reference number 54. Unlike electron beam 26 in FIG. 10, the entire electron beam 26, and thus its entire energy, passes through aperture 52. In effect, electron beam 26 has been modified to emulate an electron beam having an apparent object point 55 to the left of object point 28.

Focusing lens 24 is adjusted electrically to narrow electron beam 26. However, the boundary indicated by reference number 56 of electron beam 26 after focus lens 24 is dependent on boundary 54. Therefore, the profile of electron beam 26 at image point 58 is larger than, but proportional to, the profile of electron beam 26 at object point 28 or image point 27 in FIG. 10.

In FIG. 11, the energy of electron beam 26 remains constant from object point 28 to phosphor screen 59. This is important when displaying alphanumeric data, such as data for navigation, weapon status and targeting. Many times it is important to refer to navigation and targeting information in conditions of bright light. Accordingly, the brightness of the displayed data, and thus the energy necessary to create the display data, must be high.

In one embodiment, a five-electrode shaping lens can be used to switch between two displays projecting images into an optical sighting system. For instance, it is known to project navigational information (e.g. distance and compass information) onto a mirror within a telescope simultaneously with an optically-viewed scene. Further, it is also known to replace the optical source in such a sighting system with a CCD camera image in adverse conditions (e.g. rain, fog, snow).

EXAMPLE 2

FIG. 12 is a schematic of one embodiment of the invention having CRT 60 using a five-electrode shaping lens 48 in conjunction with an optical telescope 61. Telescope 61 comprises a partially-silvered mirror 62, an eye lens 63 and an objective lens 64. Mirror 62 receives the projected display 67 of the phosphor screen 65 and reflects the image coincident with viewed scene 44 into line-of-sight 66. A selection of mirrors is placed in the line-of-sight 66 of the operator. CRT 60 can receive images from alphanumeric generator 68 (Mode III) or CCD camera 69 (Mode I). Table 2 below describes the characteristics of Modes I and III. Mode I provides the same display as Mode I in Example 1.

TABLE 2

| | RESOLUTION | VOLTAGE PATTERN | BRIGHTNESS | MIRROR | PROJECTED ENERGY PROFILE | IMAGING DEVICE | MODE |
|---|---|---|---|---|---|---|---|
| Mode I | 640 pixels × 480 pixels | $V_{36} = V_{37} = V_{38} = V_{49} = V_{50} = 500v$ | 100 | 100% | ○ | CCD Camera | Raster Scan |
| Mode III | 320 pixels × 240 pixels | $V_{36} = V_{37} = V_{38} = V_{50} = 500v$; $V_{49} = 60v$ | 10,000 | 10% | ○ | Alphanumeric display | Stroke (vector) draw |

Mode III provides a display of relatively high brightness and moderate resolution, which is ideal for alphanumeric data. In Mode III, a substantially-lesser voltage is applied to electrode 49 than to electrodes 36, 37, 38 and 50. Ideally, the voltage applied to electrode 49 should be no more than 0.25 of the voltage applied to electrodes 36, 37, 38 and 50. As described earlier, this narrows electron beam 26 resulting in an increase to the energy at phosphor screen 65, as compared to Mode I.

The larger projected energy profile of electron beam 26 in Mode III at phosphor screen 65 is beneficial as image 70 received from alphanumeric generator 68 is of moderate resolution, approximately half the resolution of image 71 received from CCD camera 69. The voltage applied to electrode 49 is chosen to provide a projected energy profile at phosphor screen 65 approximately twice the diameter of the projected energy profile of electron beam 26 projected on phosphor screen 65 by CCD camera image 71 in Mode I. Thus, the alphanumeric display is perceived as being continuous, and can be viewed in normal daytime operating conditions.

EXAMPLE 3

Heads-Up Display (HUD) Systems are well known. Referring to FIG. 13, a partially-silvered mirror 72 is positioned in the line-of-sight 73 of the pilot/driver. CRT 60 projects the display 67 of phosphor screen 65 onto partially-silvered mirror 72 which the pilot/driver views as superimposed on scene 44 beyond the vehicle.

The invention contemplates using a single CRT 60 to project displays from different imaging devices through a lens 76 onto mirror 72. Lens 76 affects the projected display such that the image appears to be projected at "infinity" along the pilot/drivers line-of-sight, and not on mirror 72. The characteristics of a three-mode CRT 60 using a five-electrode shaping lens 48 are described in Table 3 below. In addition, the invention contemplates switching between projected displays from the different imaging devices rapidly to make the displays appear to be simultaneous to the human eye.

TABLE 3

|  | RESOLUTION | VOLTAGE PATTERN | PROJECTED ENERGY PROFILE | IMAGING DEVICE | MODE |
|---|---|---|---|---|---|
| Mode I | 640 pixels × 480 pixels | $V_{36} = V_{37} = V_{38} = V_{49} = V_{50} = 500v$ | ○ | CCD Camera | Raster Scan |
| Mode II | 640 pixels × 120 pixels | $V_{36} = V_{38} = V_{49} = V_{50} = 500v;$ $V_{37} = 460v$ | 0 | IR Camera | Raster Scan |
| Mode III | 320 pixels × 240 pixels | $V_{36} = V_{37} = V_{38} = V_{50} = 500v;$ $V_{49} = 60v$ | ○ | Alphanumeric | Stroke (vector) draw |

Mode I is identical to Mode I of Example 2, and operates in the same fashion. Mode III is identical to Mode III described in Example 2, and operates in the same fashion. Mode II provides the same display as Mode II of Example 1.

The human eye cannot perceive switching between images ("flicker") if the total time taken to present the multiple images is less than a 33 milliseconds ("msec"). Therefore, if CRT 60 can project a single frame from each of two different displays in less than 33 msec cumulatively, the human eye will interpret the images as being displayed simultaneously.

In Mode I, electron beam 26 of CRT 60 will "paint" a frame of CCD camera image 71, which has a resolution of 640 pixels by 480 pixels, in 31 msec. Electron beam 26 in Mode I performs a "raster scan" when "painting" a frame. The aim of electron beam 26 is drawn sequentially along 480 horizontal lines to "paint" the entire screen. As electron beam 26 is drawn over each portion of phosphor screen 65, the CRT 60 selectively energizes/de-energizes electron beam 26, thus causing certain portions of the phosphor screen 65 to illuminate. In this example, the total scan length of Mode I is 1,440 inches.

CRT 60 switches to Mode III in the remaining 2 msec and, using "stroke writing", "draws" the appropriate navigational, weapons status and target information. In "stroke writing", electron beam 26 is aimed only to those portions of phosphor screen 65 where information will appear. Accordingly, the writing length is much shorter than a raster scan, and the entire display can be "drawn" in the allotted 2 msec. Here, the total writing length in Mode III is between five and six inches.

Similarly rapid switching can occur between Mode II and Mode III displays. IR camera 74 has a lower resolution compared to that of CCD camera 69. Thus, the "raster scan" time for electron beam 26 to "paint" a frame of IR camera image 75 is less than 31 msec. Accordingly, there is more than ample time remaining to switch to Mode III and draw the required navigational, weapons status in targeting information within the allotted 33 msec.

Accordingly, the invention provides what appears to the human eye as simultaneous display from two different imaging sources using a single CRT.

Furthermore, three-electrode shaping lens 35 can be used to provide apparent simultaneous displays. For example, three-electrode shaping lens 35 can be used in a CRT to switch between Mode I and Mode III. Mode I would be identical to Mode I described in Example 1. Mode III is supported by the voltage pattern of $V_{36}=V_{38}=500_v$ and $V_{37}=60_v$. The voltage of electrode 36 should be no more than 0.25 of the voltage applied to electrodes 36 and 38 for optimal performance. Similarly, three-electrode shaping lens 35 can be configured to rapidly switch between Mode II and Mode III. Mode II would be identical to Mode II in Example 1 and Mode III will operate exactly as described in the immediately-preceding paragraph.

I claim:

1. In a cathode ray tube having an elongated envelope, a phosphor screen, an electron source adapted to generate an electron beam and to direct said beam along said elongated envelope toward said phosphor screen, said electron beam having an object point arranged between said electron source and said phosphor screen, the improvement comprising:

a shaping lens positioned between said object point and said phosphor screen, said shaping lens having at least five electrodes arranged in series along the path of said electron beam, each electrode having an aperture, the aperture of said first, third, fourth and fifth electrodes being circular, the aperture of said second electrode being in the form of a slit having generally-parallel sides;

means for selectively applying respective voltages to said electrodes;

whereby the projected energy profile of an image point in a plane perpendicular to the longitudinal axis of said cathode ray tube may be selectively varied.

2. The shaping lens as set forth in claim 1 wherein said apertures in said first and third electrodes have the same diameter.

3. The shaping lens as set forth in claim 2 wherein the projected energy profile is adapted to be varied between a circular shape and an elliptical shape.

4. The shaping lens as set forth in claim 3 wherein the minor axis of said elliptical shape is generally equal to the diameter of said circular shape.

5. The shaping lens as set forth in claim 2 wherein the width of said second electrode aperture is between 0.10 to 0.33 of the diameter of said first and third electrode apertures.

6. The shaping lens as set forth in claim 5 wherein the width of said second electrode aperture between said parallel sides is preferably about 0.20 of the diameter of said first and third electrode apertures.

7. The shaping lens as set forth in claim 3 wherein said voltage applied to said first electrode equals said voltage applied to said third electrode.

8. The shaping lens as set forth in claim 7 wherein said voltage applied to said second electrode is less than the voltage applied to said first and third electrodes.

9. The shaping lens as set forth in claim 2 wherein said tube has a focusing lens, and wherein said shaping lens is provided between said object point and said focusing lens along said electron beam.

10. The shaping lens as set forth in claim 9 wherein said shaping lens is positioned less than 0.10 inches from said object point.

11. The shaping lens as set forth in claim 10 wherein said first and second electrodes and said second and third electrodes are spaced from one another by a value that is about the radius of said first and third electrode apertures.

12. The method of operating a cathode ray tube having an elongated envelope, a phosphor screen, an electron source adapted to generate an electron beam promulgated along said elongated envelope between said electron source and said phosphor screen, comprising the steps of:
   providing a shaping lens having at least three electrodes arranged in series along the path of said electron beam, each electrode having an aperture, the aperture of said first and third electrodes being circular, the aperture of said second electrode being in the form of a slit having generally-parallel sides;
   providing means for selectively applying respective voltage patterns to said electrodes; and
   selectively applying said voltage patterns to said electrodes corresponding to first and second display modes to vary the amount of energy of a projected energy profile at an image point in a plane perpendicular to the longitudinal axis of said cathode ray tube.

13. The method of operating a cathode ray tube as set forth in claim 12 wherein said first display mode provides a high resolution and moderate brightness display, and said second display mode provides a moderate resolution and high brightness display.

14. The method of operating a cathode ray tube as set forth in claim 13 wherein said applied voltage pattern for said first display mode provides equal voltages to said first, second and third electrodes, and wherein said applied voltage pattern for said second display mode provides equal voltages to said first and third electrodes, and a voltage significantly less than that applied to said first and third electrodes to said second electrode.

15. The method of operating a cathode ray tube as set forth in claim 14 wherein the voltage applied to said second electrodes is no more than 0.25 of the voltage applied to said first and third electrodes.

16. The method of operating a cathode ray tube as set forth in claim 14 wherein said first display mode provides information from a high-resolution camera and said second display mode provides status information.

17. The method of operating a cathode ray tube as set forth in claim 16 wherein said second display mode is projected onto a mirror in the path of an optical sighting system trained on a scene such that said status information and said scene are simultaneously perceptible by the eye.

18. The method of operating a cathode ray tube as set forth in claim 17 wherein alternating between said first and second display modes occurs rapidly, and said first display mode and said second display mode are perceived by the eye simultaneously.

19. The method of operating a cathode ray tube as set forth in claim 18 wherein said first display mode provides raster display and said second display mode provides a stroke display.

20. The method of operating a cathode ray tube having an elongated envelope, a phosphor screen, an electron source adapted to generate an electron beam promulgated along said elongated envelope between said electron source and said phosphor screen, comprising the steps of:
   providing a shaping lens having at least three electrodes arranged in series along the path of said electron beam, each electrode having an aperture, the aperture of said first and third electrodes being circular, the aperture of said second electrode being in the form of a slit having generally-parallel sides;
   providing means for selectively applying respective voltage patterns to said electrodes; and
   selectively applying said voltage patterns to said electrodes corresponding to first and second display modes to selectively change the projected energy profile of an image point in a plane perpendicular to the longitudinal axis of said cathode ray tube between a circular shape in a first display mode and an elliptical shape in a second display mode, independently of the angle of deflection from the center line of the phosphor screen.

21. The method of operating a cathode ray tube as set forth in claim 20 wherein said first display mode provides a high-resolution display in both the horizontal and vertical axes, and wherein said second display mode provides a continuous display to the eye having a high-resolution display in one of said horizontal and vertical axes and a low-resolution display in the other of said horizontal and vertical axes.

22. The method of operating a cathode ray tube as set forth in claim 21 wherein said applied voltage pattern for said first display mode provides equal voltages for said first, second and third electrodes, and said voltage pattern for said second display mode provides equal voltages to said first and third electrodes, and a voltage slightly less than that applied to said first and third electrodes to said second electrode.

23. The method of operating a cathode ray tube as set forth in claim 22 wherein the voltage applied to said second electrode is not less than 0.75 of the voltages applied to said first and third electrodes.

24. The method of operating a cathode ray tube as set forth in claim 21 wherein said first display mode provides information from a charge-coupled device camera and said second display mode provides information from an infrared camera.

25. The method of operating a cathode ray tube as set forth in claim 21 wherein said first and second display modes are mutually exclusive.

26. The method of operating a cathode ray tube as set forth in claim 21 wherein alternating between first and second display modes occurs rapidly and said first display mode and second display mode are perceived by the eye simultaneously.

27. The method of operating a cathode ray tube as set forth in claim 26 wherein said first and second display modes are generated by a raster scanner.

28. The method of operating a cathode ray tube having an elongated envelope, a phosphor screen, an electron source adapted to generate an electron beam promulgated along said elongated envelope between said electron source and said phosphor screen, comprising the steps of:
   providing a shaping lens having at least five-electrodes arranged in series along the path of said electron beam, each electrode having an aperture, the aperture of said first, third, fourth and fifth electrodes being circular, the aperture of said second electrode being in the form of a slit having generally-parallel sides;
   providing means for selectively applying respective voltage patterns to said electrodes; and
   selectively applying said voltage patterns to said electrodes to selectively vary the amount of energy of a projected energy profile of an image point in a plane perpendicular to the longitudinal axis of said cathode ray tube between first and second display modes, and to selectively vary the projected energy profile of an image point in a plane perpendicular to the longitudinal axis of the cathode ray tube between said first display mode and a third display mode.

29. The method of operating a cathode ray tube as set forth in claim 28 wherein said first display mode provides a high-resolution display in both the horizontal and vertical axes, and wherein said second display mode provides a continuous display having a high-resolution display for one of said horizontal and vertical axes and a low-resolution display in the other of said horizontal and vertical axes, and wherein said third display mode provides a moderate resolution in high-brightness display.

30. The method of operating a cathode ray tube as set forth in claim 29 wherein the voltage pattern for said first display mode provides equal voltages to said first, second, third, fourth and fifth electrodes; wherein said voltage pattern for said second display mode provides equal voltages to said first, third, fourth and fifth electrodes, a voltage to said second electrode that is slightly less than the voltage provided to said first, fourth and fifth electrodes; and wherein said voltage pattern for said third display mode provides equal voltages to said first, second, third and fifth electrodes, and a voltage to said fourth electrode that is significantly less than the voltages provided to said first, second, third and fifth electrodes.

31. The method of operating a cathode ray tube as set forth in claim 30 wherein the voltage applied to said second electrode as part of said voltage pattern for said second display mode is no less than 0.75 of the voltage applied to said first, third, fourth and fifth electrodes, and wherein said voltage applied to said forth electrode as part of said voltage pattern for said third display mode is no more than 0.25 of the voltages applied to said first, second, third and fifth electrodes.

32. The method of operating a cathode ray tube as set forth in claim 29 wherein said first display mode provides information from a charge-coupled device, said second display mode provides information from an infrared camera and said third display mode provides status information.

33. The method of operating a cathode ray tube as set forth in claim 29 wherein said first, second and third display modes are operated mutually exclusively.

34. The method of operating a cathode ray tube as set forth in claim 33 wherein said first and third display modes are generated by a raster scanner.

35. The method of operating a cathode ray tube as set forth in claim 29 including the additional step of:
 alternating between said first and third display modes wherein said alternation between said first and third display modes occurs quickly and said first display mode and said third display mode are perceived by the eye simultaneously.

36. The method of operating a cathode ray tube as set forth in claim 29 and further including the additional step of:
 alternating between said first and third modes wherein said alternation between said first and third display modes occurs quickly an said first display mode and said third display mode are perceived by the eye simultaneously.

37. The method of operating a cathode ray tube as set forth in claim 36 wherein said first display mode provides a raster display and said third display mode provides a stroke display.

38. The method of operating a cathode ray tube as set for in claim 29 further including the step of;
 alternating between said second and third display modes wherein said alternation between said second and third display modes occurs quickly and said second display mode and said third display mode are perceived by the eye simultaneously.

39. The method of operating a cathode ray tube as set for in claim 38 wherein said second display mode provides a raster display and said third display mode provides a stroke display.

\* \* \* \* \*